United States Patent
Sherard et al.

(10) Patent No.: US 6,371,714 B1
(45) Date of Patent: Apr. 16, 2002

(54) VEHICLE RESTRAINT AND METHOD FOR MODIFYING THE SAME

(75) Inventors: Jack L. Sherard, Whitefish Bay; Douglas H. Massey, New Berlin, both of WI (US)

(73) Assignee: Kelley Company, Inc., Mequon, WI (US)

( * ) Notice: Subject to any disclaimer, the term of this patent is extended or adjusted under 35 U.S.C. 154(b) by 168 days.

(21) Appl. No.: 09/042,761

(22) Filed: Mar. 17, 1998

(51) Int. Cl.$^7$ ............................................. B65G 69/00
(52) U.S. Cl. ...................... 414/401; 414/396; 414/584; 414/809
(58) Field of Search ................................ 414/401, 396, 414/584, 800, 809; 14/69.5, 71.1; 269/55, 909

(56) References Cited

U.S. PATENT DOCUMENTS

| | | | | |
|---|---|---|---|---|
| 4,264,259 A | * | 4/1981 | Hipp | 414/401 |
| 4,379,354 A | * | 4/1983 | Hahn et al. | 414/401 |
| 4,472,099 A | * | 9/1984 | Hahn et al. | 414/401 |
| 4,648,781 A | * | 3/1987 | Sikora | 414/401 |
| 4,759,678 A | * | 7/1988 | Hageman | 414/401 |
| 4,767,254 A | * | 8/1988 | Korach et al. | 414/401 |
| 4,861,217 A | * | 8/1989 | Erlandsson | 414/401 |
| 5,071,306 A | * | 12/1991 | Alexander | 414/401 |
| 5,297,921 A | * | 3/1994 | Springer et al. | 414/401 |
| 5,702,223 A | * | 12/1997 | Hahn et al. | 414/401 |

* cited by examiner

Primary Examiner—Frank E. Werner
(74) Attorney, Agent, or Firm—Michael Best & Friedrich LLP (57) ABSTRACT

A vehicle restraint comprising a base member (e.g., a track), a carriage movably mounted to the base member, and a restraining member (e.g., a pivotable hook) mounted to the carriage and movable between and engaged position and a disengaged position. The restraining member is biased toward the engaged position. The restraining member is biased by a biasing member in the form of a gas spring operatively positioned between the restraining member and the carriage. The restraining member is pivotable, and the restraint further includes a lever interconnected with the restraining member. In this embodiment, the biasing member is interconnected with the lever to bias the restraining member toward an engaged position. The biasing member can be positioned to bias the restraining member toward the disengaged position when the restraining member is in the disengaged position and to bias the restraining member toward the engaged position when the restraining member is in the engaged position.

20 Claims, 8 Drawing Sheets

VEHICLE RESTRAINT AND METHOD FOR MODIFYING THE SAME

BACKGROUND OF THE INVENTION

This invention relates to vehicle restraints for use at loading docks.

Prior art vehicle restraints are disclosed in U.S. Pat. Nos. 4,264,259 and 4,648,781, the disclosures of which are incorporated by reference. The vehicle restraints in these patents are attached to a loading dock and include a hook that engages the ICC bar of a trailer to prevent the trailer from moving away from the loading dock. The hook can be rotated by a motor to a down or disengaged position to allow the truck to back up to the dock. The motor is also used to pivot the hook from the down position to an up or engaged position in which the hook engages the ICC bar of the trailer.

In operation, the above-described restraints are stored with the hook in the disengaged position. Once a vehicle is properly positioned at the loading dock with the ICC bar positioned above the hook, the motor is activated to pivot the hook to the engaged position. The motor is controlled by a timer such that the motor shuts off when the motor has rotated the hook for a predetermined length of time. The predetermined length of time corresponds to the time necessary for the motor to cause the hook to rotate from the disengaged position to a full-up position. Somewhere between the disengaged position and the full-up position, the hook engages the ICC bar, at which time a clutch mechanism between the motor and the hook allows the motor to continue to run until the timer shuts the motor off.

The motor used in the prior art vehicle restraint is commonly referred to in the art as a worm gear motor. The worm gear motor has a gear ratio large enough to make the device self-locking. That is, when the power to the motor is turned off, the gears substantially fix the motor output shaft against rotation in either the forward or reverse direction. In this respect, the worm gear motor is self-locking.

One problem with this prior art vehicle restraint is that it relies on the clutch mechanism to hold the hook in place against the ICC bar. A second problem with this prior art device is that it requires the tip of the hook to wrap around the top of the ICC bar to securely restrain the trailer. When a trailer is loaded or unloaded, the rear portion of the trailer typically moves up and down and fore and aft as forklifts travel into and out of the trailer. This motion of the trailer can cause the clutch mechanism to slip, causing the hook to rotate down by small increments. Such movement of the hook is commonly referred to in the art as "hook sag." Once the hook has sagged to a certain position (i.e., where the tip of the hook no longer wraps around the top of the ICC bar), it no longer adequately restrains the trailer. This defeats the purpose of the vehicle restraint and creates a potentially dangerous situation in which the trailer is not restrained from movement away from the loading dock.

Such prior art releasable locking devices require constant monitoring of the state of the hook to make sure the bottom of the hook tip does not drop below the top of the ICC bar. In some circumstances, the motor has to be re-activated repeatedly to reposition the hook against the ICC bar. If the hook moves to an unsafe position while the forklift operator is in the trailer, an unsafe condition can exist without the operator being aware.

U.S. Pat. No. 4,648,781 discloses an improvement to the above described device. The improvement comprises automatically re-energizing the motor when the hook sags below a certain position, to thereby raise the hook back into contact with the ICC bar. This improvement may enhance the safety of the device, but its drawback is that it is a very expensive option and is not easily adapted to the old units that are already installed. Furthermore, the prior art improvement can reduce the life of the motor due to the repeated re-energizing of the motor.

SUMMARY OF THE INVENTION

The present invention alleviates the above-noted problems by providing a vehicle restraint comprising a base member (e.g., a track), a carriage movably mounted to the base member, and a restraining member (e.g., a pivotable hook) mounted to the carriage and movable between an engaged position and a disengaged position. The restraining member is biased toward the engaged position. By virtue of this arrangement, if the restraining member is forced down due to motion of the vehicle, the restraining member will move back to full engagement with the ICC bar, thereby ensuring full restraining capabilities. This is accomplished without the need to re-energize the motor, and thus is more reliable and will not unduly stress the motor. The present invention is also relatively inexpensive to incorporate into the prior art design, and can be easily field-installed onto existing prior art units.

Preferably, the restraining member is biased by a biasing member in the form of a gas spring that can be operatively positioned between the restraining member and the carriage. In one embodiment, the restraining member is pivotable, and the restraint further includes a lever interconnected with the restraining member. In this embodiment, the biasing member is interconnected with the lever to bias the restraining member toward an engaged position. The biasing member can be positioned to bias the restraining member toward the disengaged position when the restraining member is in the disengaged position and to bias the restraining member toward the engaged position when the restraining member is in the engaged position. In this manner, the restraining member is held in the disengaged position by the biasing member.

The above-described vehicle restraint can be produced by modifying existing vehicle restraints that have a base member, a carriage movably mounted to the base member, and a restraining member mounted to the carriage and movable between an engaged position and a disengaged position. The method comprises the step of interconnecting a biasing member with the restraining member to bias the restraining member toward the engaged position. For example, the interconnecting step can include the step of operatively positioning the biasing member between the carriage and the restraining member.

In one embodiment, the restraining member includes a hook mounted to a shaft. In this embodiment, the interconnecting step comprises the steps of mounting a lever to the shaft and attaching the biasing member to the lever. If the vehicle restraint includes a driven sprocket secured to the shaft, then the method can further include the steps of removing the driven sprocket from the shaft, and mounting a lost-motion sprocket to the shaft. The lost-motion sprocket allows the restraining member to move independent of the motor and clutch.

BRIEF DESCRIPTION OF THE DRAWINGS

FIG. 7b is a section view of the lost-motion sprocket taken along line 7b—7b in FIG. 7a.

DETAILED DESCRIPTION

The present invention is a modification of an existing vehicle restraint sold by Rite-Hite Corporation under the trademark DOK-LOK. The general structure and operation of the DOK-LOK restraint is disclosed in U.S. Pat. Nos. 4,648,781 and 4,264,259.

Figure 1:
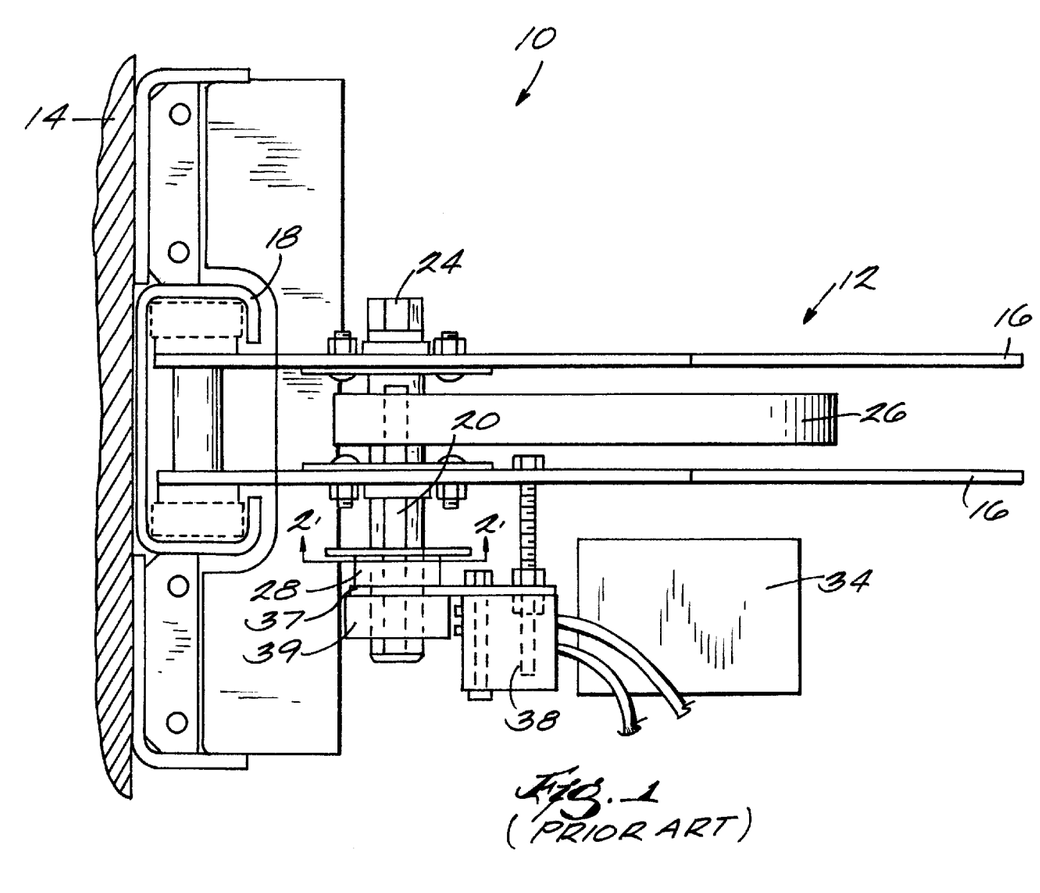
FIG. 1 is a top view of a prior art vehicle restraint.
Figure 2:
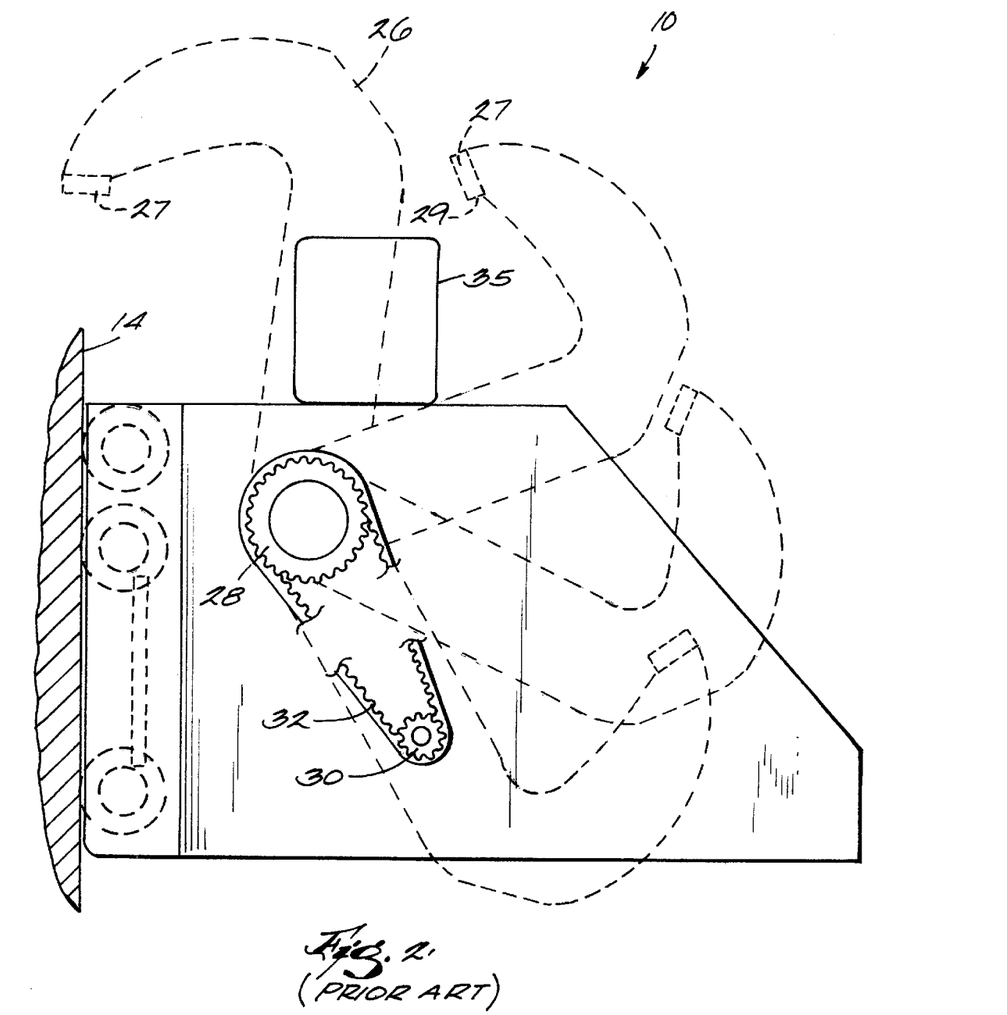
FIG. 2 is a side view of the prior art restraint taken along line 2—2 in FIG. 1 with the hook member shown in four different positions.

Referring to FIGS. 1 and 2, the prior art DOK-LOK restraint 10 includes a carriage 12 attached to a face of a loading dock 14. The carriage 12 includes generally parallel plate members 16, and is movable in a track 18. Journaled through the plate members 16 is a shaft 20 which is rotatable with respect to the plate members 16 about an axis of rotation. The shaft 20 includes a hex end 24.

A hook member 26 having a tip 27 is secured to the shaft 20, and rotates with the shaft 20. FIG. 2 illustrates the hook member 26 in four different positions. A driven sprocket 28 is also secured to the shaft 20, and is coupled to a drive sprocket 30 via a drive chain 32 (FIG. 2). A motor 34 is positioned to rotate the drive sprocket 30, thereby causing the drive chain 32 to rotate the driven sprocket 28. Because the driven sprocket 28 is fixed to the shaft 20, rotation of the driven sprocket 28 is transferred to the shaft 20, which in turn causes rotation of the hook member 26. A friction clutch and a gear reducer (not shown) is operatively positioned between the motor 34 and the drive sprocket 30.

The motor 34 in the DOK-LOK restraint 10 causes the hook member 26 to rotate to an engaged position so that the hook member 26 engages an ICC bar 35 of a trailer and restrains the ICC bar 35 trailer from moving away from the loading dock 14. In this regard, it is noted that proper securement of the ICC bar 35 requires that the bottom edge 29 of the tip 27 be maintained above the top of the ICC bar 35.

The prior art restraint also includes a switch plate 37, a switch box 38 having switches, and a cam member 39. The switch plate 37 is fixed to the carriage 12, and the cam member 39 is fixed to the shaft 20.

Figure 3:
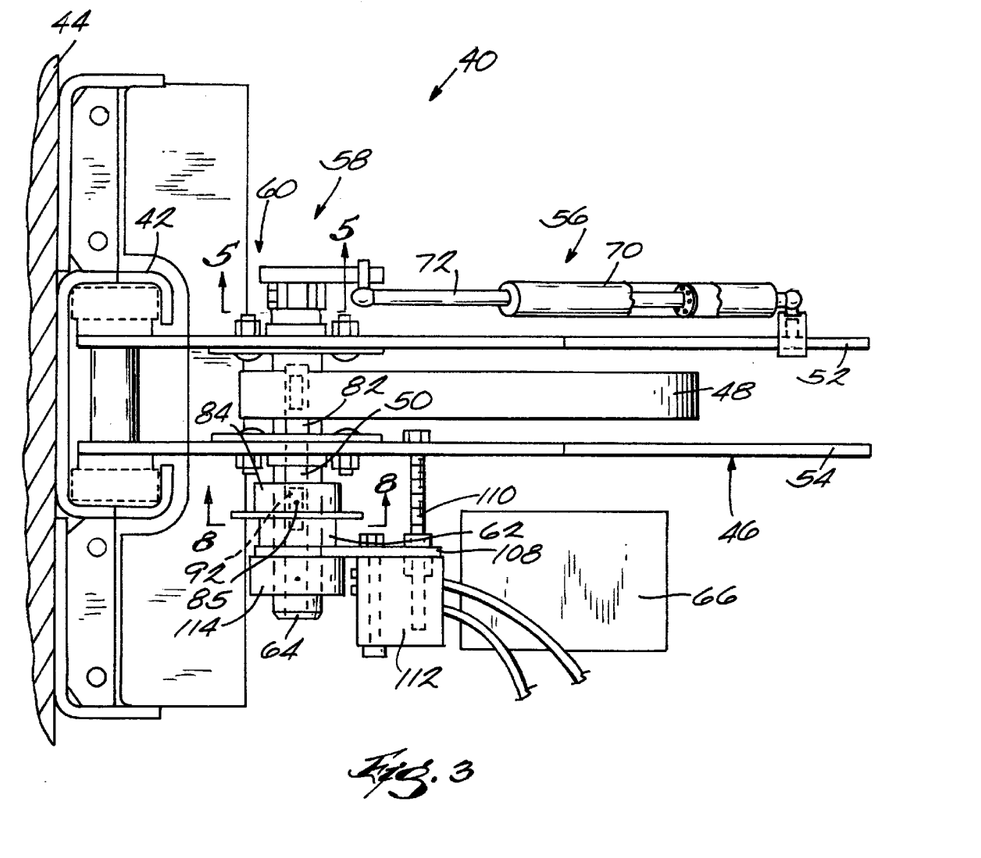
FIG. 3 is a top view of the vehicle restraint device according to the present invention with a portion of the gas spring assembly removed for the purpose of illustration.
Figure 4:
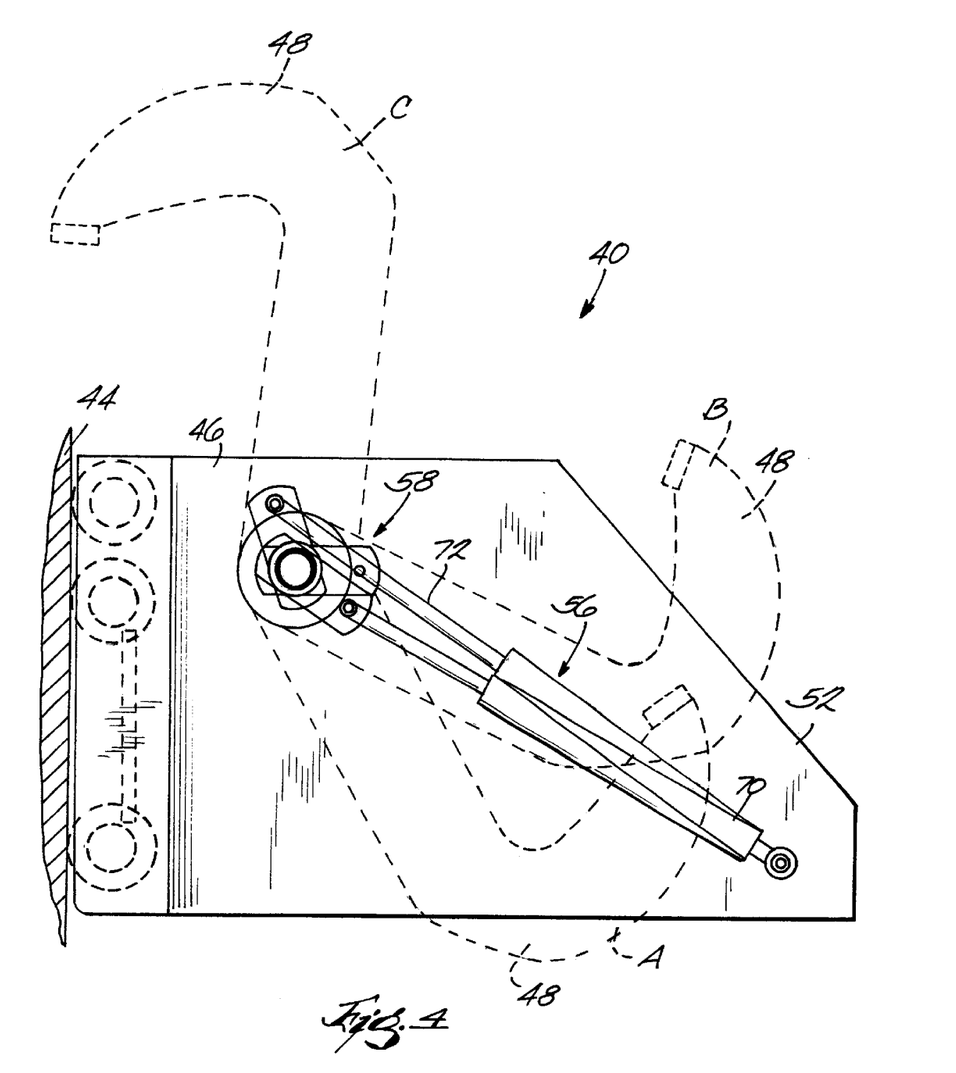
FIG. 4 is a side view of the device in FIG. 3 illustrating only the carriage, hook, lever assembly, and gas spring assembly, and with the hook shown in various positions.

A modified vehicle restraint 40 embodying the present invention is illustrated in FIGS. 3 and 4. The illustrated restraint includes a base member in the form of a track 42 mounted on a dock face 44, a carriage 46 mounted for vertical movement along the track 42, and a restraining member in the form of a hook 48 pivotally mounted on the carriage 46. The hook 48 is secured to a shaft 50, and the shaft 50 is rotatably mounted in the carriage 46 through apertures formed in generally parallel first and second plate members 52, 54. A biasing member in the form of a gas spring assembly 56 is attached to a lever assembly 58 which is attached to a hex end 60 of the shaft 50. A lost-motion member in the form of a sprocket 62 is attached near a second end 64 of the shaft 50, and is coupled to a drive mechanism in the form of an electric motor 66 by a drive chain (not shown) and drive sprocket (not shown). The motor, drive chain, and drive sprocket are all conventional and disclosed in the prior art patents cited above.

The gas spring assembly 56 includes a cylinder 70 and a push rod 72 slidably positioned within the cylinder 70. The cylinder 70 contains a pressurized gas. The pressurized gas creates a biasing force that biases the push rod 72 away from the cylinder 70 along a line of force directed along the longitudinal axis of the push rod 72. One end of the cylinder 70 is pivotally attached to the first plate member 52, and the other end of the push rod 72 is pivotally attached to the lever assembly 58. A mechanical compression, tension, or torsional spring could be substituted for the gas spring assembly 56, and these types of biasing members are within the scope of the invention.

Figure 5A:
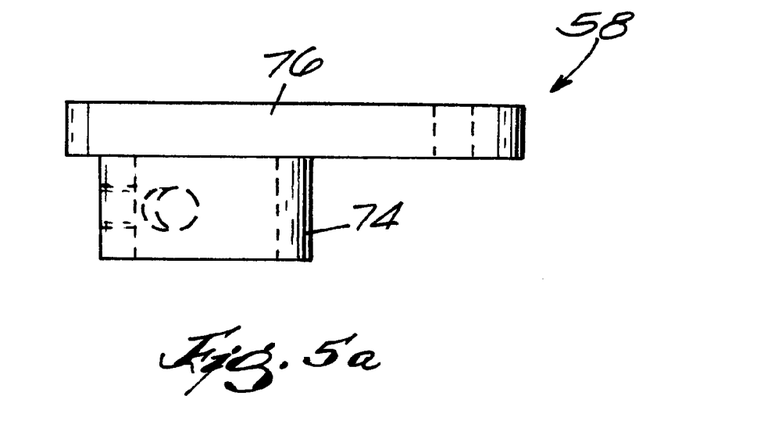
FIG. 5a is a top view of the lever assembly of the device.
Figure 5B:
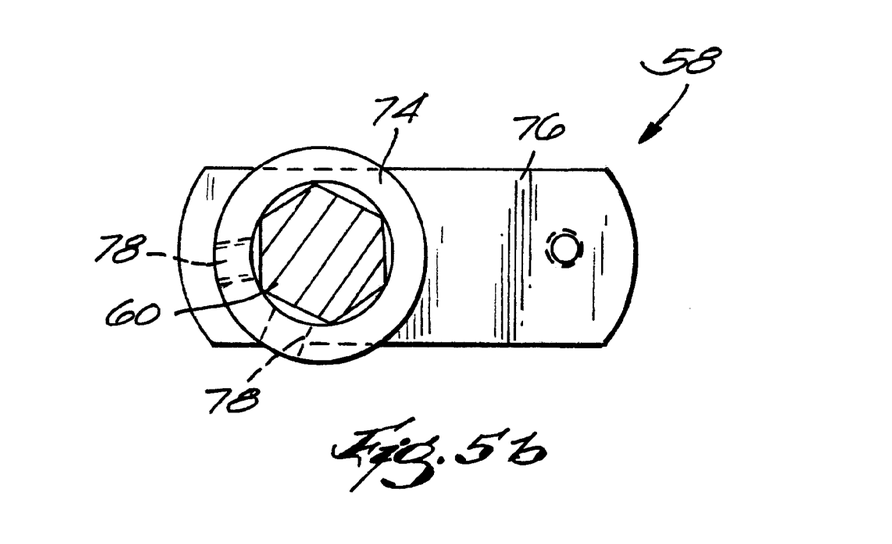
FIG. 5b is a section view of the shaft and the lever assembly of the device taken along line 5—5 in FIG. 3.

Referring to FIGS. 5a and 5b, the lever assembly 58 includes a first collar 74 and a lever 76 rigidly attached to the first collar 74. The lever 76 includes a distal end pivotally attached to the push rod 72 (FIG. 3). The first collar 74 is fitted over the hex end 60 of the shaft 50. The first collar 74 defines a pair of threaded holes 78 (FIG. 5b). Set screws (not shown) are threaded into the threaded holes 78 and abut the hex end 60 of the shaft 50, thereby rigidly fixing the lever assembly 58 to the shaft 50.

As can be seen in FIG. 4, the configuration of the gas spring assembly 56 and the lever assembly 58 causes the lever assembly 58 to rotate with the shaft 50 about the axis of rotation of the shaft 50. The pivotal connection between the lever 76 and the push rod 72 causes the end of the push rod 72 to follow a curved path defined by the distal end of the lever 76, while the end of the cylinder 70 rotates about a fixed axis of rotation at the location where it is connected to the first plate member 52. This configuration causes the line of force of the gas spring assembly 56 to move across the axis of rotation of the shaft 50. Thus, depending on the relative positions of the shaft 50 and the line of force, the gas spring assembly 56 will bias the shaft 50 either clockwise or counter-clockwise.

Referring to FIG. 3, the shaft 50 passes through apertures in the first and second plate members 52, 54 and is thus journaled for rotation about the longitudinal axis of rotation. An elongated keyway 82 is provided in the shaft 50. The hook member 48 is keyed to the shaft 50 in a conventional manner intermediate the first and second plate members 52, 54. Because of the connection between the shaft 50 and the hook 48, the hook 48 rotates with the shaft 50 about the longitudinal axis of rotation.

Figure 6A:
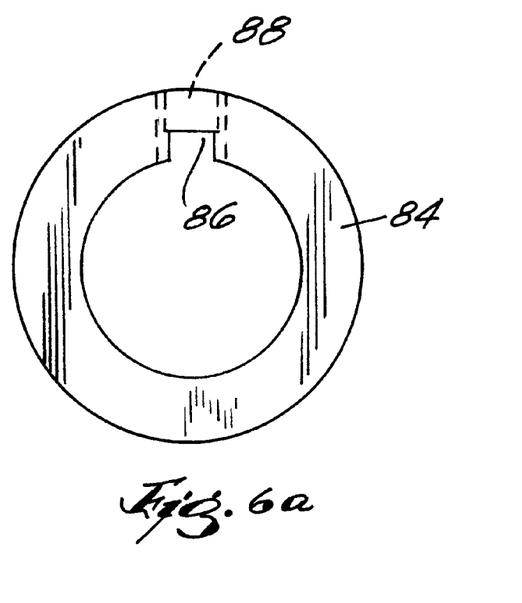
FIG. 6a is an end view of the second collar.
Figure 6B:
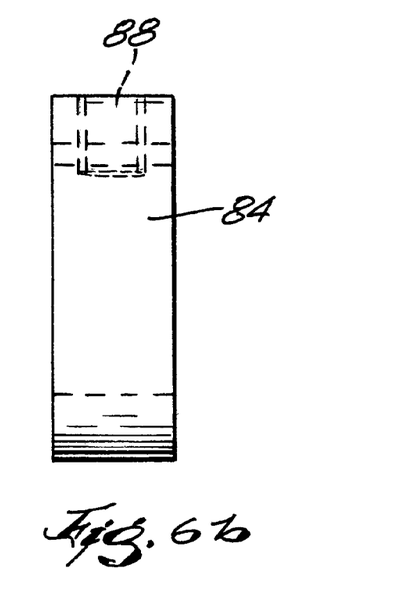
FIG. 6b is a side view of the second collar.

A second collar 84, having a substantially circular profile, is positioned over the shaft 50. Referring to FIGS. 3, 6a and 6b, a keyway 86 is formed in the inner surface of the second collar 84. A threaded hole 88 is formed in the second collar 84 and intersects the keyway 86 so that a set screw 85 can be threaded into the threaded hole 88 to abut a key 92 in the keyway 86 in a conventional manner. In this manner, the second collar 84 is secured relative to the shaft 50.

Figure 7A:
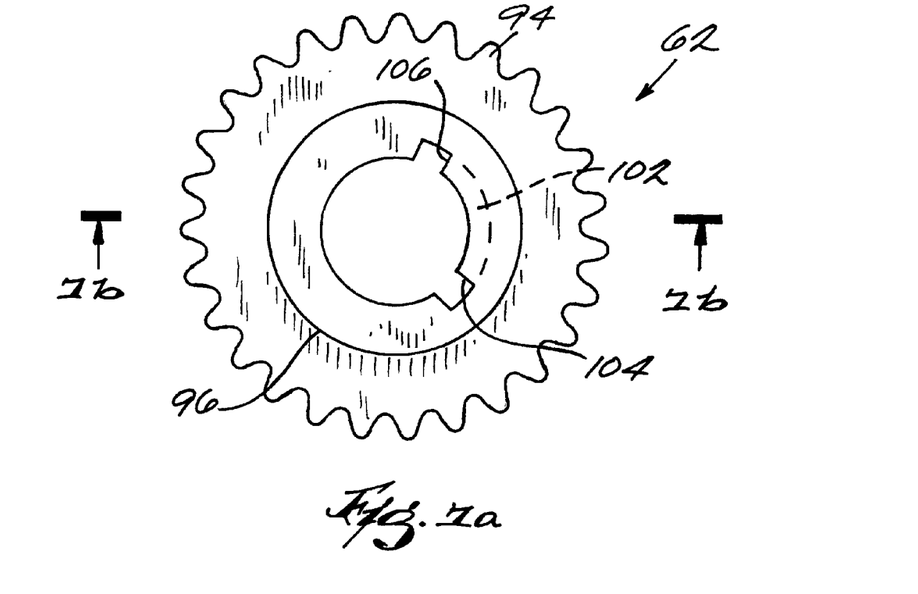
FIG. 7a is an end view of the lost-motion sprocket of the device.
Figure 7B:
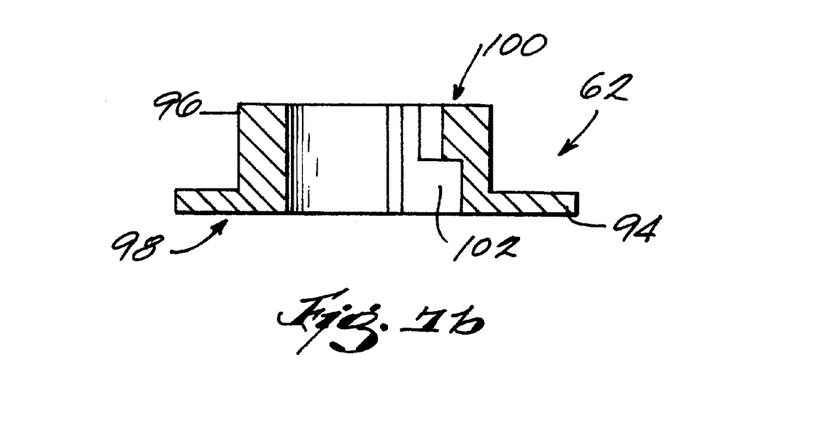

The lost-motion sprocket 62 is positioned between the second collar 84 and the second end 64 of the shaft 50, and over a portion of the keyway 82 in the shaft 50. Referring to FIGS. 7a and 7b, the lost-motion sprocket 62 includes a sprocket portion 94 and a hub portion 96. The sprocket portion 94 is essentially a disk having conventional sprocket teeth for engaging the drive chain. The sprocket portion 94 includes a first surface 98 that abuts the second collar 84. The hub portion 96 extends away from the sprocket portion 94, and is substantially cylindrical in shape. The hub portion 96 includes a second surface 100 that faces in an opposite direction from the first surface 98.

A lost-motion keyway 102 is formed in the inner surface of the lost-motion sprocket 62. The lost-motion keyway 102 defines an arc or lost-motion angle of about 108° in the preferred embodiment. The lost-motion keyway 102 extends between an engaging wall 104 and a disengaging wall 106. The lost-motion keyway 102 also extends from the first surface 98 and has a depth equal to about half the distance between the first surface 98 and the second surface 100. The lost-motion keyway 102 also has a height that is substantially equal to the height of the keyway 86 in the second collar 84. The key 92 is used to couple the second collar 84, the lost-motion sprocket 62, and the shaft 50.

Referring again to FIG. 3, a switch plate 108 is positioned around the shaft 50 between the lost-motion sprocket 62 and the second end 64 of the shaft 50. The switch plate 108 may be of a type having an aperture through which the shaft 50 passes, or of the type having a semi-circular or fork-shaped end that partially embraces the shaft 50. Regardless of the type of switch plate used, the switch plate 108 is connected to the second plate member 54 by conventional means, such as a bolt 110, and allows the shaft 50 to rotate with respect to the switch plate 108.

A switch box 112 is attached to the switch plate 108 by conventional means, and includes first and second limit switches as described in the prior art patents mentioned above.

A cam member 114 is also attached by conventional means, such as a set screw and key, to the shaft 50 for rotation therewith. The cam member 114 has cam surfaces that operate the limit switches as described in U.S. Pat. No. 4,648,781. As described in that patent, the switches cause various alarms and other notifications to activate when the hook is in various positions. The switch plate 108 ensures that the switches are positioned properly with respect to the cam surfaces. The cam member 114 is positioned against the switch plate 108, and causes the switch plate 108 to maintain the lost-motion sprocket 62 against the second collar 84.

In operation, the hook 48 is initially held in a disengaged position in which the hook 48 does not extend beyond the edge of the carriage 46 (position "A" in FIG. 4). In the disengaged position, the line of force of the gas spring assembly 56 is under center with respect to the center of the shaft 50. Preferably, the line of force is 5° under center. Because the line of force is under center, and acts on the lever 76, the shaft 50 is biased toward the disengaged position.

Figure 8A:
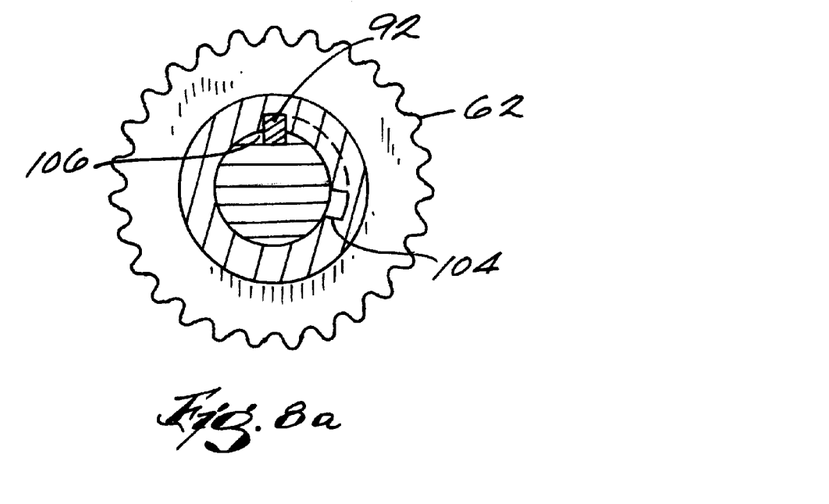
FIG. 8a is a section view taken along line 8—8 in FIG. 3 of the lost-motion sprocket and key in the disengaged position.

The motor is deactivated when the hook 48 is in the disengaged position. in this regard, the line of force is not required to be under center in this position, as the friction clutch would restrain the hook 48 against the biasing force of the gas spring assembly 56. However, to ensure that the hook 48 remains in the disengaged position, it is preferred to have the line of force under center in the disengaged position. In the disengaged position, the key 92 is located adjacent the disengaging wall 106 in the lost-motion keyway 102 (FIG. 8a).

Figure 8B:
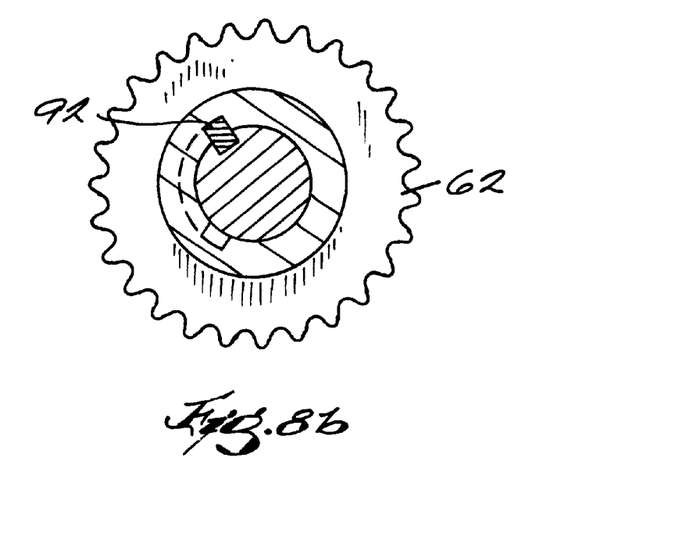
FIG. 8b is a section view taken along line 8—8 in FIG. 3 of the lost-motion sprocket and key in the just-over-center position.

Once a trailer has been backed up against the dock, the motor is activated and rotates the lost-motion sprocket 62 in the forward direction. The total lost-motion sprocket rotation comprises two components. Because the key 92 is initially positioned against the disengaging wall 106 (see FIG. 8a), the lost-motion sprocket 62 must first rotate through the lost-motion angle, during which the lost-motion sprocket 62 rotates freely with respect to the shaft 50. This rotation positions the key 92 against the engaging wall 104 of the lost-motion keyway 102. In the second component of the rotation, contact between the engaging wall 104 and the key 92 causes the shaft 50, and consequently the hook 48, to rotate through a hook rotation angle (see FIG. 8b) to position the hook 48 over center (position "B" in FIG. 4).

After the hook 48 has been positioned in the over-center position, the gas spring assembly 56 takes over and, acting through the lever 76, rotates the hook 48 toward the engaged position. The hook 48 will continue to rotate until it contacts an ICC bar or until it reaches a full-up position (position "C" in FIG. 4). Once the hook 48 has engaged the ICC bar of the trailer, the motor will continue to drive the lost-motion sprocket 62 until the engaging wall 104 again contacts the key 92, at which point the clutch will slip until the timer shuts the motor off.

In this condition, the hook 48 will float with the movement of the trailer as the trailer is unloaded or loaded. Because of the biasing of the gas spring assembly 56, the hook 48 will always bear against the ICC bar, and will retain the ICC bar, resisting movement of the trailer away from the dock.

When it is time to disengage the hook 48 from the trailer, the motor is turned on to rotate in the reverse direction for a preselected time controlled by the timer. The lost-motion sprocket 62 will rotate until the disengaging wall 106 contacts the key 92, and then the hook 48 will begin rotating toward the disengaged position. Once the motor has completed rotating the lost-motion sprocket 62 in the reverse direction, the lost-motion sprocket 62 and the key 92 will be in the position shown in FIG. 8a, and the hook 48 will be in the disengaged position described above and illustrated in FIG. 4. The motor will continue to rotate, and the friction clutch will slip, until the timer shuts the motor off.

The prior art vehicle restraint device illustrated in FIGS. 1 and 2 is convertible to one incorporating the present invention through the following steps. First, with the hook 26 in the disengaged position, the drive chain 32 is removed from the prior art restraint device. Then the prior art sprocket 28, switch plate, and cam are removed from the shaft 20.

The second collar 84 is slid over the second end 64 of the shaft 50, and positioned over the keyway 82 with the key 92 received in both the shaft keyway 82 and the keyway 86 of the second collar 84 as shown in FIG. 3. The set screw 85 is threaded into the threaded hole 88 in the second collar 84 to secure the key 92 and the second collar 84 with respect to the shaft 50. The lost-motion sprocket 62 is slid over the second end 64 of the shaft 50 and positioned such that the first surface 98 of the lost-motion sprocket 62 abuts the second collar 84 and the key 92 is received in the lost-motion keyway 102. The switch plate 108 is then slid over the second end 64 of the shaft 50 and positioned adjacent the second surface 100 of the lost-motion sprocket 62. Then the cam member 114 is slid onto the shaft 50, pressed against the switch plate 108, and affixed to the shaft 50 in a conventional way, for example, by a set screw and key.

Next, the first collar 74 of the lever assembly 58 is positioned over the hex end 60 of the shaft 50, and the set screws are threaded into the threaded holes 78 in the first collar 74 to abut the hex end 60 of the shaft 50 and rigidly fix the lever assembly 58 to the shaft 50 in the disengaged position below center. The gas spring assembly 56 is then pivotally attached to the first flange 52 and the lever 76. Last, the drive chain is attached to the sprocket portion 94 of the lost-motion sprocket 62.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A vehicle restraint for restraining a vehicle adjacent a loading dock, the vehicle restraint comprising:
   a base member adapted to be mounted in front of a face portion of the dock;
   a carriage movably mounted to said base member;
   a restraining member mounted to said carriage and movable between an engaged position in which said restraining member is adapted to engage the vehicle and a disengaged position in which said restraining member is adapted to disengage the vehicle, said restraining member being biased toward the engaged position;
   a drive mechanism capable of moving said restraining member between the engaged and disengaged positions; and
   a clutch connecting said drive mechanism to said restraining member.

2. The vehicle restraint of claim 1, wherein said base member comprises a track, and wherein said carriage is substantially vertically movable within said track.

3. The vehicle restraint of claim 2, wherein said carriage is biased upwardly relative to said base member.

4. The vehicle restraint of claim 1, wherein said restraining member is pivotally mounted to said carriage.

5. The vehicle restraint of claim 4, further comprising:
   a lever interconnected with said restraining member; and
   a biasing member interconnected with said lever to bias said restraining member toward the engaged position.

6. The vehicle restraint of claim 1, further comprising a biasing member for biasing said restraining member.

7. The vehicle restraint of claim 6, wherein said biasing member comprises a gas spring.

8. The vehicle restraint of claim 6, wherein said biasing member is positioned to bias said restraining member toward the disengaged position when said restraining member is in the disengaged position and to bias said restraining member toward the engaged position when said restraining member is in the engaged position.

9. The vehicle restraint of claim 1, wherein said restraining member comprises a hook.

10. The vehicle restraint of claim 1, further comprising a lost-motion member operatively positioned between said clutch and said restraining member to allow movement of said restraining member without movement of said clutch.

11. The vehicle restraint of claim 10, wherein said drive mechanism comprises an electric motor.

12. The vehicle restraint of claim 10, wherein said lost-motion member comprises a sprocket.

13. The vehicle restraint of claim 12, further comprising a shaft for rotatably supporting said restraining member, wherein said sprocket is rotatably mounted on said shaft to provide lost-motion driving of said shaft.

14. The vehicle restraint of claim 13, wherein said shaft includes a key, and wherein said sprocket includes a lost-motion keyway that engages said key.

15. A method of modifying a vehicle restraint for restraining a vehicle adjacent a loading dock, the restraint having a base member adapted to be mounted in front of a face portion of the dock, a carriage movably mounted to the base member, and a restraining member mounted to the carriage and movable between an engaged position in which the restraining member is adapted to engage the vehicle and a disengaged position in which the restraining member is adapted to disengage the vehicle, said method comprising the step of:
   interconnecting a biasing member between the carriage and the restraining member to bias the restraining member toward the engaged position.

16. The method of claim 15, wherein the restraining member includes a hook mounted to a shaft, and wherein said interconnecting step comprises the steps of:
   mounting a lever to the shaft; and
   attaching the biasing member to the lever.

17. The method of claim 16, wherein the vehicle restraint further includes a driven sprocket secured to the shaft, and wherein the method further comprises the steps of:
   removing the driven sprocket from the shaft; and
   mounting a lost-motion sprocket to the shaft.

18. The method of claim 17, further comprising the step of mounting a collar to the shaft adjacent to the lost-motion sprocket.

19. A vehicle restraint for restraining a vehicle adjacent a loading dock, the vehicle restraint comprising:
   a base member adapted to be mounted on a face portion of the dock;
   a carriage movably mounted to said base member;
   a restraining member rotatably mounted to said carriage and movable between an engaged position in which said restraining member is adapted to engage the vehicle and a disengaged position in which said restraining member is adapted to disengage the vehicle; and
   a biasing member operatively positioned between said carriage and said restraining member to bias said restraining member toward the engaged position.

20. The vehicle restraint of claim 19, further comprising a biasing member for biasing said carriage upward relative to said base member.

* * * * *

UNITED STATES PATENT AND TRADEMARK OFFICE
CERTIFICATE OF CORRECTION

PATENT NO. : 6,371,714 B1
DATED : April 22, 2003
INVENTOR(S) : Jack L. Sherard et al.

It is certified that error appears in the above-identified patent and that said Letters Patent is hereby corrected as shown below:

<u>Title page,</u>
Item [56], References Cited, U.S. PATENT DOCUMENTS, please insert the following:

| | | | |
|---|---|---|---|
| -- 4,282,621 | 8/1981 | Anthony et al. | 14/71.1 |
| 4,373,847 | 2/1983 | Hipp et al. | 414/401 |
| 4,443,150 | 4/1984 | Hahn et al. | 414/401 |
| 4,560,315 | 12/1985 | Hahn | 414/401 |
| 4,695,216 | 9/1987 | Erlandsson | 414/401 |
| 4,938,647 | 7/1990 | Erlandsson | 414/401 -- |

Signed and Sealed this

Twenty-fourth Day of February, 2004

JON W. DUDAS
*Acting Director of the United States Patent and Trademark Office*